United States Patent [19]

Brown

[11] 3,961,873
[45] June 8, 1976

[54] APPARATUS FOR REINFORCING TUBING

[75] Inventor: Martin Luther Brown, Elkton, Md.

[73] Assignee: E. I. Du Pont de Nemours and Company, Wilmington, Del.

[22] Filed: Jan. 31, 1975

[21] Appl. No.: 546,180

[52] U.S. Cl. ............................. 425/114; 156/431; 264/173; 264/275; 425/380; 425/467
[51] Int. Cl.² ................................... B29F 3/00
[58] Field of Search ........... 156/143, 244, 500, 428, 156/429, 430, 431, 432; 264/275, 278, 134, 137, 173, 281; 425/122, 112, 123, 113, 114, 467, 817 C, 380, 381, 4 C

[56] References Cited
UNITED STATES PATENTS

| | | |
|---|---|---|
| 2,800,683 | 7/1957 | Teichmann ........................ 425/112 |
| 3,229,005 | 1/1966 | Reifenhauser ............. 425/817 C X |
| 3,256,559 | 6/1966 | Boggs ................................. 425/122 |
| 3,289,250 | 12/1966 | Zernay ............................... 425/113 |
| 3,375,550 | 4/1968 | Klein .............................. 425/466 X |
| 3,534,437 | 10/1970 | Quackenbush ................. 425/114 X |

FOREIGN PATENTS OR APPLICATIONS 220,907  11/1958  Australia............................ 425/113

Primary Examiner—Francis S. Husar
Assistant Examiner—Mark Rosenbaum

[57] ABSTRACT

This invention relates to an apparatus for reinforcing extruded elastomeric or plastic tubing in which two sets of reinforcing filaments are helically wound around the tubing in opposite directions and the filaments are introduced into the tubing through an annular opening.

4 Claims, 1 Drawing Figure

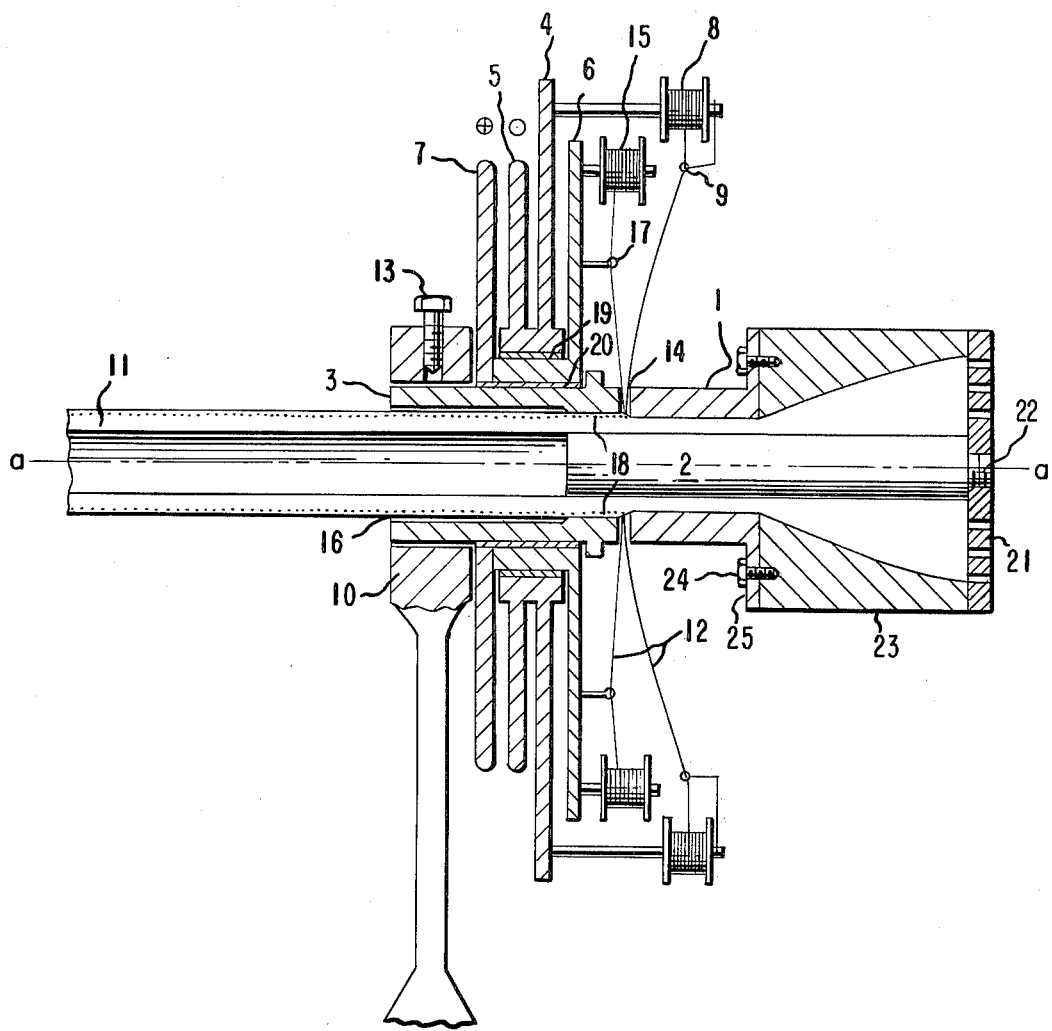

APPARATUS FOR REINFORCING TUBING

BACKGROUND OF THE INVENTION

This invention relates to an apparatus for reinforcing extruded elastomeric or plastic tubing.

Devices for manufacturing reinforced tubing by helically winding two sets of filaments around the tubing in opposite directions are well known in the art (Teichman U.S. Pat. No. 2,800,683, Klein U.S. Pat. No. 3,375,550). In both of these devices the reinforcing filament is fed through one or more holes in the nozzle. The portion of the nozzle through which the reinforcing filament passes is part of the spool carriers which rotate.

In the present invention the reinforcing filaments are fed to the surface of the molten or softened tubing through an annular slot or opening extending through the wall portion of the nozzle around the mandrel. The use of an annular opening is an improvement over the prior art in that it eliminates rotation of the nozzle or any portion thereof.

SUMMARY OF THE INVENTION

This invention relates to an apparatus for reinforcing elastomeric or plastic tubing which comprises a cylindrical mandrel, a means for attaching the cylindrical mandrel to an extruder, a first ring die surrounding and concentric with the cylindrical mandrel, a means for attaching the first ring die to the extruder, a second ring die surrounding and concentric with the cylindrical mandrel and longitudinally spaced apart from the first ring die to form an annular opening, a means for supporting the second ring die, and a pair of spool carriers, the first of which is rotatably mounted on bearings which are located on the outer surface of the second ring die, and the second of which is rotatably mounted on bearings which are located on the outer surface of the first spool carrier so that the spool carriers can rotate in opposite directions around the axis of the cylindrical mandrel which runs perpendicular to all radii of the cylindrical mandrel, said spool carriers for holding spools of reinforcing filament.

DETAILED DESCRIPTION OF THE INVENTION

The FIGURE is a fragmentary, sectional, elevational view showing one possible apparatus constructed in accordance with the present invention.

In the FIGURE, the first ring die 1, cylindrical mandrel 2, and second ring die 3 comprise the nozzle. Cylindrical mandrel 2 is positioned concentrically inside first ring die 1 and they are attached to a conventional extruder. Mandrel 2 can be attached to breaker plate 21 by threaded joint 22 at the outlet end of an extruder. First ring die 1 can be attached to extruder discharge 23 by bolt 24 and flange 25 which is a part of first ring die 1. Mandrel 2 and first ring die 1 are spaced apart so that tubing 11 which is in a molten or softened state can pass through the space. Mandrel 2 should terminate at the junction of annular channel 16 and annular channel 18. Reinforcing filaments 12 are introduced into the surface of tubing 11 through annular opening 14 which separates first ring die 1 and second ring die 3. Annular opening 14 extends around mandrel 2 and its size should be slightly larger than two times the diameter of the reinforcing filaments. The annular opening can be adjusted by movement of stand 10. Set screw 13 can also be used to adjust the annular opening. Reinforcing filaments 12 originate from spools 8 and 15 and the tension is controlled by guides 9 and 17. As reinforcing filaments are introduced into tubing 11, its volume increases. Annular channel 18 provides a release for the increased volume and its diameter is larger than the inside diameter of first ring die 1. Its size depends on the diameter of the filament and the number of spools present. Its size should be equal to the volume of tubing reinforced with filament and can be easily determined. Annular channel 16 is a release for back pressure and its diameter is larger than annular channel 18. Spools 8 and 15 are supported by spool carriers 4 and 6, respectively. There can be numerous spools attached to each spool carrier and the number of spools is limited only by the size of the spools and spool carriers. Spool carriers 4 and 6 are adapted to rotate in opposite directions around axis a—a. This provides two sets of reinforcing filaments which are helically wound in opposite directions around tube 11. Spool carriers 4 and 6 are turned in opposite directions by any suitable drives 7 and 5, such as chain and sprocket drives. Bearings 19 and 20 are present on the outer surface of second ring die 3 and the outer surface of the base of spool carrier 6, respectively. The purpose of the bearings is to provide a means of rotation for the spool carriers.

Once the reinforcing filaments are introduced into the tubing, the flow of the tubing will pull the threads through the annular opening. The tubing should be in molten or softened state so that the threads will be embedded into the tubing surface. Spool carriers 4 and 6 should rotate at the same speed in opposite directions and they should rotate at a speed which will introduce the filaments into the tubing at about a 54° angle from axis a—a. Tubing 11 can be constructed of any plastic or elastomer. Reinforcing filament 12 can be made of such material as cotton, nylon, polyester, or steel.

I claim

1. An apparatus for reinforcing elastomeric or plastic tubing which comprises:
    a. a cylindrical mandrel,
    b. a means connected to said mandrel for attaching the cylindrical mandrel to an extruder,
    c. a first ring die surrounding and concentric with the cylindrical mandrel,
    d. a means connected to said first ring die for attaching the first ring die to the extruder,
    e. a second ring die surrounding and concentric with the cylindrical mandrel and longitudinally spaced apart from the first ring die to form an annular opening,
    f. a means connected to said second ring die for supporting the second ring die, and
    g. a pair of spool carriers, the first of which is rotatably mounted on bearings which are located on the outer surface of the second ring die, and the second of which is rotatably mounted on bearings which are located on the outer surface of the base of the first spool carrier so that the spool carriers can rotate in opposite directions around the axis of the cylindrical mandrel which runs perpendicular to all radii of the cylindrical mandrel, said spool carriers for holding spools of reinforcing filament.

2. The apparatus of claim 1 wherein the spools are mounted on the spool carrier and the spools are located near the plane extending through the annular opening and perpendicular to the axis of the cylindrical mandrel which runs perpendicular to all radii of the cylindrical mandrel.

3. The apparatus of claim 1 in which the annular opening is slightly larger than 2 times the diameter of reinforcing filament.

4. The apparatus of claim 1 wherein a portion of the second ring die extends beyond the cylindrical mandrel and the portion which surrounds the cylindrical mandrel has a larger inside diameter than the inside diameter of the first ring die and the portion of the second ring die which does not surround the cylindrical mandrel has a larger inside diameter than the inside diameter of the portion of the second ring die which surrounds the cylindrical mandrel.

* * * * *